(12) United States Patent
Ding et al.

(10) Patent No.: US 9,405,046 B2
(45) Date of Patent: Aug. 2, 2016

(54) HIGH SOLAR GAIN LOW-E PANEL AND METHOD FOR FORMING THE SAME

(71) Applicant: Intermolecular Inc., San Jose, CA (US)

(72) Inventors: Guowen Ding, San Jose, CA (US);
Jeremy Cheng, Cupertino, CA (US);
Minh Huu Le, San Jose, CA (US);
Daniel Schweigert, Fremont, CA (US);
Zhi-Wen Sun, Sunnyvale, CA (US);
Guizhen Zhang, Santa Clara, CA (US)

(73) Assignee: Intermolecular, Inc., San Jose, CA (US)

( * ) Notice: Subject to any disclaimer, the term of this patent is extended or adjusted under 35 U.S.C. 154(b) by 135 days.

(21) Appl. No.: 13/799,100

(22) Filed: Mar. 13, 2013

(65) Prior Publication Data

US 2014/0268317 A1    Sep. 18, 2014

(51) Int. Cl.
| | |
|---|---|
| *F21V 9/04* | (2006.01) |
| *F21V 9/06* | (2006.01) |
| *G02B 5/08* | (2006.01) |
| *G02B 5/20* | (2006.01) |
| *C03C 17/36* | (2006.01) |
| *G02B 5/28* | (2006.01) |

(52) U.S. Cl.
CPC .............. *G02B 5/208* (2013.01); *C03C 17/36* (2013.01); *C03C 17/366* (2013.01); *C03C 17/3644* (2013.01); *G02B 5/281* (2013.01)

(58) Field of Classification Search
CPC .............. C03C 17/3644; C03C 17/366; C03C 2218/154; G02B 5/208
USPC ............ 359/360, 359, 585, 588, 589; 428/34, 428/216, 212, 336, 428, 432, 469, 472, 701, 428/702, 680; 204/192.1; 349/8
See application file for complete search history.

(56) References Cited

U.S. PATENT DOCUMENTS

| | | | |
|---|---|---|---|
| 4,462,883 | A | 7/1984 | Hart |
| 5,153,054 | A | 10/1992 | Depauw |
| 6,919,133 | B2 * | 7/2005 | Hartig ............... C03C 17/36 428/428 |
| 7,056,588 | B2 | 6/2006 | Neuman |
| 7,153,579 | B2 | 12/2006 | Kriltz |
| 7,807,248 | B2 | 10/2010 | German |
| 7,901,781 | B2 | 3/2011 | Maschwitz |
| 8,003,235 | B2 | 8/2011 | Gagliardi |
| 2010/0221575 | A1 * | 9/2010 | Stull .......................... 428/680 |
| 2010/0279144 | A1 | 11/2010 | Frank |
| 2011/0097590 | A1 | 4/2011 | Lemmer |
| 2011/0262694 | A1 * | 10/2011 | Janssen ............ C03C 17/3435 428/119 |
| 2013/0164464 | A1 * | 6/2013 | Lage et al. ................... 428/34 |

FOREIGN PATENT DOCUMENTS

GB     2479388 A     10/2011

* cited by examiner

*Primary Examiner* — Ricky Mack
*Assistant Examiner* — Mustak Choudhury

(57) ABSTRACT

Embodiments provided herein describe low-e panels and methods for forming low-e panels. A transparent substrate is provided. A reflective layer is formed above the transparent substrate. An over-coating layer is formed above the reflective layer. The over-coating layer includes first, second, and third sub-layers. The second sub-layer is between the first and third sub-layers, and the first and third sub-layers include the same material.

16 Claims, 3 Drawing Sheets

HIGH SOLAR GAIN LOW-E PANEL AND METHOD FOR FORMING THE SAME

The present invention relates to low-e panels. More particularly, this invention relates to high solar gain low-e panels and methods for forming such low-e panels.

BACKGROUND OF THE INVENTION

Low emissivity, or low-e, panels are often formed by depositing a reflective layer (e.g., silver), along with various other layers, onto a transparent (e.g., glass) substrate. The various layers typically include various dielectric and metal oxide layers, such as silicon nitride, tin oxide, and zinc oxide, to provide a barrier between the stack and both the substrate and the environment, as well as to act as optical fillers and function as anti-reflective coating layers to improve the optical characteristics of the panel.

When used in, for example, windows, and depending on the particular environment (i.e., climate), it may be desirable for the low-e panels to allow solar radiation to pass through the window in one direction and block heat from passing through in the opposite direction. For example, in relatively cold climates, it may be desirable to allow solar radiation to pass through the panel from the exterior to the interior of a building, but prevent (or minimize) heat on the interior from escaping back through the panel to the exterior.

Such operation may facilitate maintaining a suitable temperature on the interior of the building and reduce heating costs. Such panels (or windows) are often referred to as "high solar gain" panels. In order to maximize the performance of these panels, it is desirable to increase the solar gain (sometimes referred to as "g-value") as much as possible, while maintaining suitable optical characteristics.

BRIEF DESCRIPTION OF THE DRAWINGS

To facilitate understanding, identical reference numerals have been used, where possible, to designate identical elements that are common to the figures. The drawings are not to scale and the relative dimensions of various elements in the drawings are depicted schematically and not necessarily to scale.

The techniques of the present invention can readily be understood by considering the following detailed description in conjunction with the accompanying drawings, in which.

DETAILED DESCRIPTION

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

Embodiments of the invention provide low-e optical coatings (and/or panels) with high/improved solar gain coefficients. Such coatings may, for example, be used in windows/low-e panels in low temperature climates in which it is desirable to allow solar radiation to pass through, while preventing heat in the interior of the building from escaping back through the window. In accordance with one aspect of the invention, this is accomplished with a multi-layer over-coating layer. In some embodiments, this over-coating layer is formed over a barrier layer, which is in turn formed over a reflective (e.g., silver) layer.

In some embodiments, the over-coating layer includes three sub-layers in which the upper and lower sub-layers are made of the same material, while the sub-layer between the upper and lower sub-layers (i.e., the intermediate sub-layer) is made of a different material. In some embodiments, the upper and lower sub-layers include zinc (e.g., zinc oxide), and the intermediate sub-layer includes aluminum (e.g., aluminum-tin oxide).

In some embodiments, the barrier layer includes titanium, nickel, niobium, or a combination thereof. The low-e coating may also include additional oxide layers over which the silver layer is formed, such as an additional zinc oxide layer and an additional aluminum-tin oxide layer. Additionally, other protective layers, such as silicon nitride, may be formed over the over-coating layer and between the substrate and the other layers of the coating.

Embodiments utilizing this over-coating demonstrate an improved solar gain (i.e., g-value) over prior art low-e coatings. Additionally, because the over-coating layer utilizes materials/sub-layers used in other layers in the low-e coating, any additional manufacturing costs are minimized.

Figure 1:
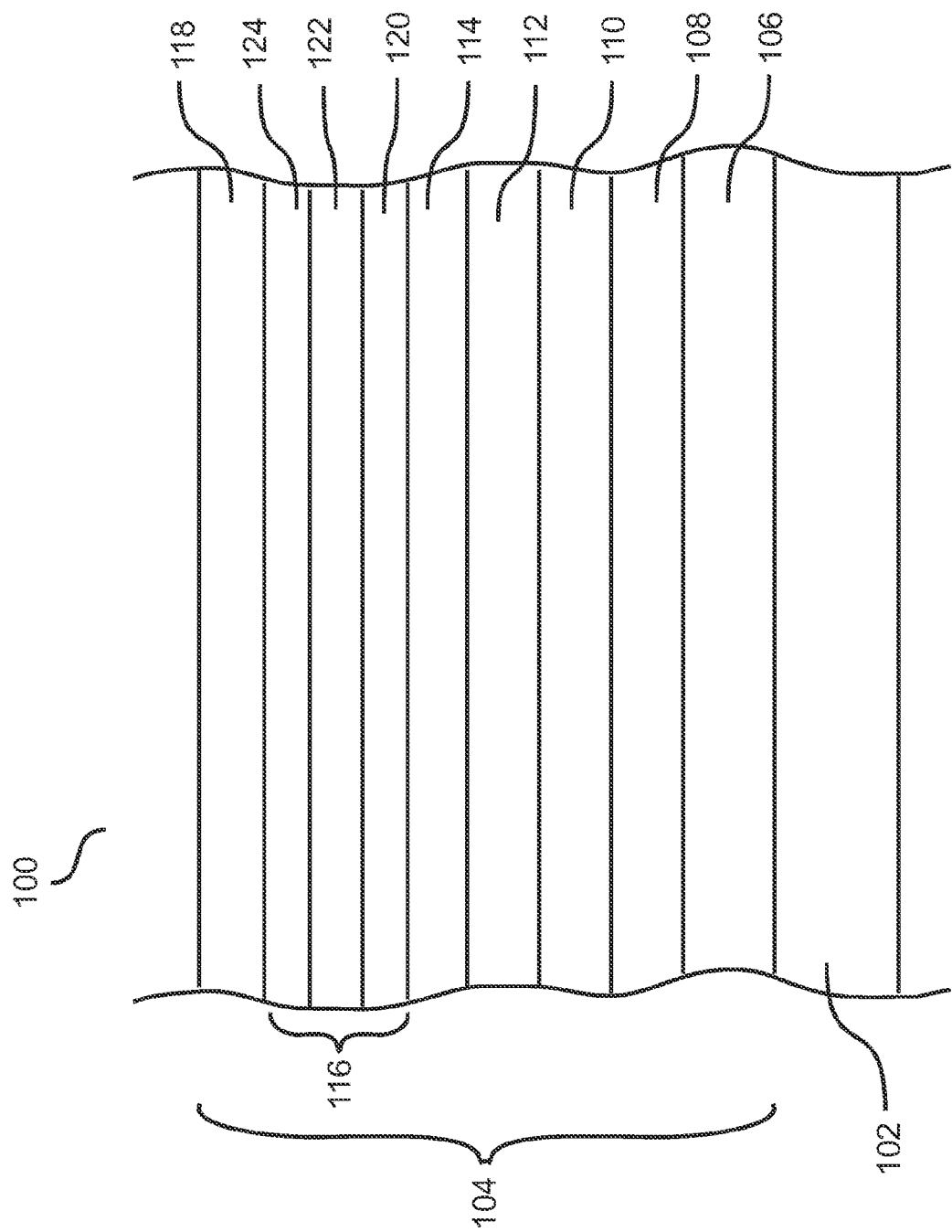
FIG. 1 is a cross-sectional side view of a low-e panel according to some embodiments of the present invention.

FIG. 1 illustrates a low-e panel (or a high solar gain low-e panel) 100 according to some embodiments of the present invention. The low-e panel 100 includes a transparent substrate 102 and a low-e stack 104 formed over (or above) the transparent substrate 102. The transparent substrate 102 in some embodiments is made of a low emissivity glass, such as borosilicate glass. However, in other embodiments, the transparent substrate 102 may be made of plastic or polycarbonate. The transparent substrate 102 has a thickness of, for example, between about 1 and about 10 millimeters (mm). In a testing environment, the transparent substrate 102 may be round with a diameter of, for example, about 200 or about 300 mm. However, in a manufacturing environment, the transparent substrate 102 may be square or rectangular and significantly larger (e.g., about 0.5-about 6 meters (m) across).

The low-e stack 104 includes a lower dielectric layer 106, a base layer 108, a seed layer 110, a reflective layer 112, a barrier layer 114, an over-coating layer 116, and an upper dielectric layer 118. Exemplary details as to the functionality provided by each of the layers 106-118 are provided below.

The various layers in the low-e stack 104 may be formed sequentially (i.e., from bottom to top) on the transparent substrate 102 using a physical vapor deposition (PVD) and/or reactive sputtering processing tool. In some embodiments, the low-e stack 104 is formed over the entire substrate 102. However, in other embodiments, the low-e stack 104 may only be formed on isolated portions of the transparent substrate 102. Although the layers may be described as being formed "above" or "over" the previous layer (or the substrate), it should be understood that in some embodiments, each layer is formed directly on (and adjacent to) the previously provided/formed component (e.g., layer). In other embodiments, additional layers may be included between the layers, and other processing steps may also be performed between the formation of various layers.

The lower dielectric layer 106 is formed above the upper surface of the transparent substrate 102. The low dielectric layer 106 may, for example, be made of silicon nitride and have a thickness of about 250 Angstroms (Å). The lower dielectric layer 106 may protect the other layers in the stack 104 from any elements which may otherwise diffuse from the transparent substrate 102 and may be used to tune the optical properties (e.g., transmission) of the stack 104 and/or the low-e panel 100 as a whole.

The base layer (or lower metal oxide layer) 108 is formed above the lower dielectric layer 106. The base layer 106 may be made of a metal oxide and have a thickness of, for example, approximately 150 Å. In some embodiments, the base layer 108 is made of aluminum-tin oxide. Other suitable materials are, for example, titanium oxide, zinc oxide, tin oxide, and metal alloy oxides, such as zinc-tin oxide. The base layer 106 may be used to tune the optical properties of the low-e panel 100 as a whole, as well as to enhance silver nucleation.

The seed layer 110 is formed over the base layer 108. The seed layer 110 is made of a metal oxide and may have a thickness of, for example, approximately 100 Å. In some embodiments, the metal oxide used in the seed layer 110 is zinc oxide. The seed layer 110 may be used to enhance the deposition/growth of the reflective layer 112 on the low-e stack 104 (e.g., enhance the crystalline structure and/or texturing of the reflective layer 112) and increase the transmission of the stack 104 for anti-reflection purposes. It should be understood that in other embodiments, the seed layer 110 may be made of tin oxide or may not be included at all.

The reflective layer 112 is formed above the seed layer 110. In some embodiments, the reflective layer 112 is made of silver and has a thickness of, for example, about 100 Å. As in commonly understood, the reflective layer 112 is used to reflect infra-red electro-magnetic radiation, thus reducing the amount of heat that may be transferred through the low-e panel 100.

The barrier layer 114 is formed over the reflective layer 112. The barrier layer 114 may include nickel, titanium, niobium, or a combination thereof. For example, in some embodiments, the barrier layer is made of nickel-titanium-niobium oxide. The barrier layer 114 may have a thickness of, for example, between 30 and 100 Å. The barrier layer 114 is used to protect the reflective layer 112 from the processing steps used to form the other, subsequent layers of the low-e stack 104 and to prevent any interaction of the material of the reflective layer 112 with the materials of the other layers of the low-e stack 104, which may result in undesirable optical characteristics of the low-e panel 100.

Still referring to FIG. 1, the over-coating layer (or upper metal oxide layer) 116 is formed over (e.g., and adjacent to) the barrier layer 114. The over-coating layer may be made with the same material(s) as the base layer 108 and/or the send layer 110 and have a thickness of, for example, between 60 and 600 Å. In the example shown in FIG. 1, the over-coating layer includes three sub-layers: a first (or lower) sub-layer 120, a second (or intermediate or middle) sub-layer 122, and a third (or upper) sub-layer 122. As shown, the first sub-layer 120 is formed above the barrier layer 114, and the second sub-layer 122 is between the first sub-layer 120 and the third sub-layer 124.

In some embodiments, the first sub-layer 120 and the third sub-layer 124 are made of the same material (e.g., including zinc), while the second sub-layer 122 is made a different material (e.g., including aluminum and/or tin and not including zinc) than that first and third sub-layers 120 and 124. For example, the first and third sub-layers 120 and 124 may be made of zinc oxide, and the second sub-layer 122 may be made of aluminum-tin oxide. In some embodiments, the first and third sub-layers each have a thickness of, for example, between 20 and 80 Å, and the second sub-layer 124 has a thickness of, for example, between 20 and 400 Å.

The over-coating layer 116 may be used to further tune the optical properties of the low-e panel 100 as a whole. Additionally, in accordance with one aspect of the present invention, the over-coating layer 116 may enhance the solar gain performance of the low-e panel 100.

Still referring to FIG. 1, the upper dielectric layer 118 is formed above the over-coating layer 116. Similar to the lower dielectric layer 106, the upper dielectric layer 118 may be made of silicon nitride and have a thickness of about 250 Angstroms (Å). The upper dielectric layer 118 may be used to provide additional protection for the lower layers of the stack 104 and further adjust the optical properties of the low-e panel 100. The upper dielectric layer may also be considered to be an over-coating layer (i.e., or a second over-coating layer).

It should be noted that depending on the exact materials used, some of the layers of the low-e stack 104 may have some materials in common. For example, in the embodiments described above, the seed layer 110 and the first and third sub-layers 120 and 124 of the over-coating layer 116 may be made of the same material (e.g., zinc oxide). Similarly, the base layer 108 and the second sub-layer 122 of the over-coating layer 116 may both be made of aluminum-tin oxide, while the lower and upper dielectric layers 106 and 118 may both be made of silicon nitride. As a result, embodiments described herein may allow for a relatively low number of different targets to be used for the formation of the low-e stack 104.

It should also be understood that the low-e panel 100 may be a portion of (or installed in) a larger, more complex device or system, such as a low-e window. Such a window may include multiple glass substrates (or panes), other coatings (or layers), such a thermochromic coating formed on a different pane than the low-e stack 104, and various barrier or spacer layers formed between adjacent panes.

Low-e panels (and/or low-e windows) utilizing the low-e stack 104 described above showed an improved/increased solar gain (i.e., g-value) when compared to prior art high solar gain low-e panels, while maintaining suitable optical performance. For example, some embodiments of the high solar gain low-e panel described above may have a solar gain of over 70 (i.e., 70% solar transmittance), while prior art high solar gain low-e panels typically achieve solar gain of less than 70. This improvement in solar gain may be attributable, at least in part, to the relatively low extinction coefficient of the material (e.g., aluminum-tin oxide) used in the second sub-layer 122, especially when combined with a barrier layer that may provide optimum transmittance (e.g., nickel-titanium-niobium oxide). As an additional benefit, any additional manufacturing costs are minimized because the over-coating layer described above utilizes materials used in other layers the low-e stack.

It should also be understood that the combination of the sub-layers 120, 122, and 124 within the over-coating layer 116 may optimize the solar gain. For example, in one experimental low-e panel having three sub-layers 120, 122, and 124 as described above (e.g., first and third sub-layers made of zinc oxide at 40 Å thick and a second sub-layer made of aluminum-tin oxide at 240 Å thick), the solar gain was shown to be approximately 71.2. However, in an experimental low-e panel formed without the third sub-layer 120 (e.g., a first sub-layer made of zinc oxide at 40 Å thick and a second sub-layer made of aluminum-tin oxide at 240 Å thick), the solar gain was shown to be 70.6. Similarly, in an experimental low-e panel formed without the first sub-layer 124 (e.g., a third sub-layer made of zinc oxide at 40 Å thick and a second sub-layer made of aluminum-tin oxide at 240 Å thick), the solar gain was shown to be 70.5.

Figure 2:
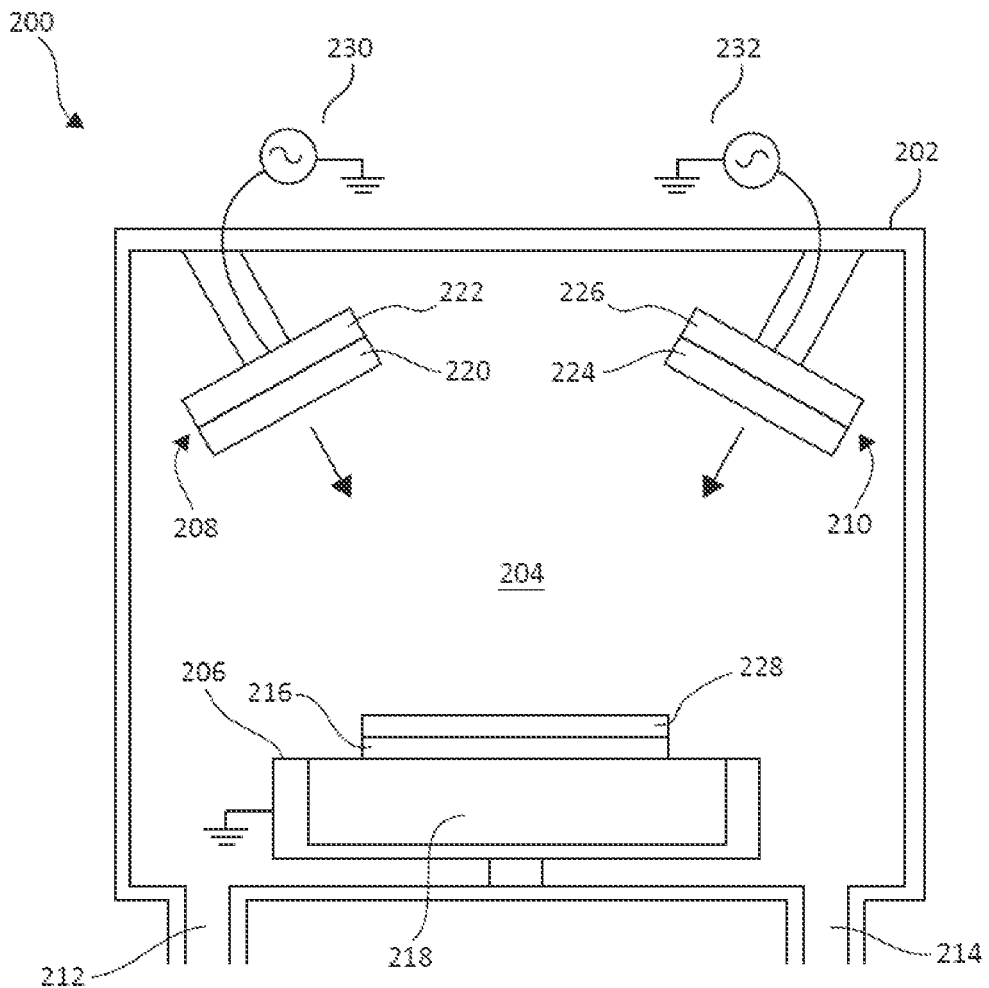
FIG. 2 is a simplified cross-sectional diagram illustrating a physical vapor deposition (PVD) tool according to some embodiments of the present invention.

FIG. 2 provides a simplified illustration of a physical vapor deposition (PVD) tool (and/or system) 200 which may be used to formed the low-e panel 10 and/or the low-e stack 14 described above, in accordance with some embodiments of the invention. The PVD tool 200 shown in FIG. 2 includes a housing 202 that defines, or encloses, a processing chamber 204, a substrate support 206, a first target assembly 208, and a second target assembly 210.

The housing 202 includes a gas inlet 212 and a gas outlet 214 near a lower region thereof on opposing sides of the substrate support 206. The substrate support 206 is positioned near the lower region of the housing 202 and in configured to support a substrate 216. The substrate 216 may be a round glass (e.g., borosilicate glass) substrate having a diameter of, for example, about 200 mm or about 300 mm. In other embodiments (such as in a manufacturing environment), the substrate 216 may have other shapes, such as square or rectangular, and may be significantly larger (e.g., about 0.5-about 6 m across). The substrate support 206 includes a support electrode 218 and is held at ground potential during processing, as indicated.

The first and second target assemblies (or process heads) 208 and 210 are suspended from an upper region of the housing 202 within the processing chamber 204. The first target assembly 208 includes a first target 220 and a first target electrode 222, and the second target assembly 210 includes a second target 224 and a second target electrode 226. As shown, the first target 220 and the second target 224 are oriented or directed towards the substrate 216. As is commonly understood, the first target 220 and the second target 224 include one or more materials that are to be used to deposit a layer of material 228 on the upper surface of the substrate 216.

The materials used in the targets 220 and 224 may, for example, include tin, zinc, magnesium, aluminum, lanthanum, yttrium, titanium, antimony, strontium, bismuth, silicon, silver, nickel, chromium, niobium, or any combination thereof (i.e., a single target may be made of an alloy of several metals). Additionally, the materials used in the targets may include oxygen, nitrogen, or a combination of oxygen and nitrogen in order to form oxides, nitrides, and oxynitrides. Additionally, although only two targets 220 and 224 are shown, additional targets may be used.

The PVD tool 200 also includes a first power supply 230 coupled to the first target electrode 222 and a second power supply 232 coupled to the second target electrode 224. As is commonly understood, the power supplies 230 and 232 pulse direct current (DC) power to the respective electrodes, causing material to be, at least in some embodiments, simultaneously sputtered (i.e., co-sputtered) from the first and second targets 220 and 224.

During sputtering, inert gases, such as argon or krypton, may be introduced into the processing chamber 304 through the gas inlet 212, while a vacuum is applied to the gas outlet 214. However, in embodiments in which reactive sputtering is used, reactive gases may also be introduced, such as oxygen and/or nitrogen, which interact with particles ejected from the targets (i.e., to form oxides, nitrides, and/or oxynitrides), as may be the case with the formation of the sub-layers of the over-coating layers described above.

Although not shown in FIG. 2, the PVD tool 200 may also include a control system having, for example, a processor and a memory, which is in operable communication with the other components shown in FIG. 2 and configured to control the operation thereof in order to perform the methods described herein.

Further, although the PVD tool 200 shown in FIG. 2 includes a stationary substrate support 206, it should be understood that in a manufacturing environment, the substrate 216 may be in motion during the various layers described herein.

Figure 3:
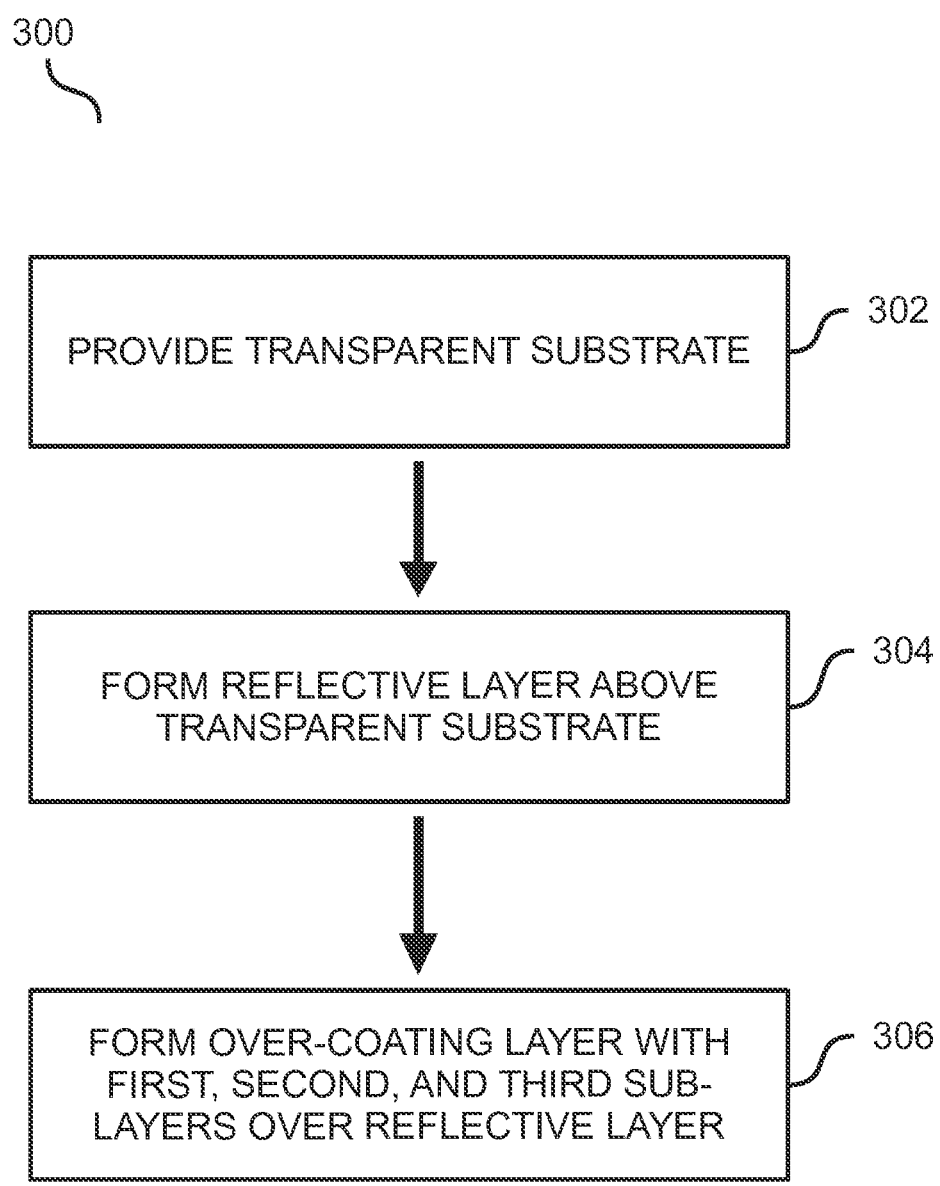
FIG. 3 is a flow chart illustrating a method for forming a low-e panel according to some embodiments of the present invention.

FIG. 3 is a flow chart illustrating a method 300 for forming a low-e panel according to some embodiments of the present invention. The method 300 begins at block 302 by providing a transparent substrate such as the examples described above (e.g., glass).

At block 304, a reflective layer (e.g., silver) is formed above the transparent substrate. In some embodiments, the reflective layer is made of silver.

At block 306, an over-coating layer is formed over the reflective layer. As described above, the over-coating layer includes first, second, and third sub-layers. In some embodiments, the first sub-layer and the third sub-layer are made of the same material and include zinc (e.g., zinc oxide), and the second sub-layer (between the first and third sub-layers) is made a different material than the first and third sub-layers and includes aluminum and/or tin and does not include zinc (e.g., aluminum-tin oxide). Although not shown in FIG. 3, additional processing may be performed, such as the formation of additional layers such as those described above (e.g., dielectric layers).

Thus, in some embodiments, a method for forming a low-e panel is provided. A transparent substrate is provided. A reflective layer is formed above the transparent substrate. An over-coating layer is formed above the reflective layer. The over-coating layer includes first, second, and third sub-layers. The second sub-layer is between the first and third sub-layers, and the first and third sub-layers include the same material.

In some embodiments, a method for forming a high solar gain low-e panel is provided. A transparent substrate is provided. A reflective layer is formed above the transparent substrate. The reflective layer includes silver. A barrier layer is formed above the reflective layer. The barrier layer includes titanium. An over-coating layer is formed above the barrier layer. The over-coating layer includes first, second, and third sub-layers. The second sub-layer is between the first and third sub-layers, and the first and third sub-layers include the same material.

In some embodiments, a low-e panel is provided. A transparent substrate is provided. A reflective layer is formed above the transparent substrate. An over-coating layer is formed above the reflective layer. The over-coating layer includes first, second, and third sub-layers. The second sub-layer is between the first and third sub-layers, and the first and third sub-layers include the same material.

Although the foregoing examples have been described in some detail for purposes of clarity of understanding, the invention is not limited to the details provided. There are many alternative ways of implementing the invention. The disclosed examples are illustrative and not restrictive.

What is claimed:
1. A method for forming a low-e panel comprising:
providing a transparent substrate;
forming a reflective layer above the transparent substrate;

forming a barrier layer directly on the reflective layer, wherein the barrier layer comprises nickel-titanium-niobium oxide; and forming an over-coating layer above the barrier layer, the over-coating layer comprising first, second, and third sub-layers, wherein the second sub-layer is between the first and third sub-layers, and the first and third sub-layers consist of zinc oxide, and the second sub-layer consists of aluminum-tin oxide, wherein the first sub-layer of the over-coating layer is formed directly on the barrier layer, the second sub-layer of the over-coating layer is formed directly on the first sub-layer of the over-coating layer, and the third sub-layer of the over-coating layer is formed directly on the second sub-layer of the over-coating layer, and wherein the low-e panel has a solar transmittance of over 70%.

2. The method of claim 1, wherein the transparent substrate comprises glass.

3. The method of claim 2, wherein the reflective layer comprises silver.

4. The method of claim 3, further comprising forming at least two layers between the transparent substrate and the reflective layer, wherein at least one of the at least two layers comprises aluminum-tin oxide and at least one of the at least two layers comprises zinc oxide.

5. The method of claim 4, further comprising forming a dielectric layer directly on the third sub-layer of the over-coating layer, wherein the dielectric layer comprises silicon nitride.

6. A method for forming a high solar gain low-e panel comprising:

providing a transparent substrate;

forming a base layer above the transparent substrate, wherein the base layer consists of aluminum-tin oxide;

forming a seed layer directly on the base layer, wherein the seed layer consists of zinc oxide;

forming a reflective layer directly on the seed layer, wherein the reflective layer comprises silver;

forming a barrier layer directly on the reflective layer, wherein the barrier layer consists of nickel-titanium-niobium oxide; and forming an over-coating layer above the barrier layer, the over-coating layer comprising first, second, and third sub-layers, wherein the second sub-layer is between the first and third sub-layers, the first and third sub-layers consist of zinc oxide, and the second sub-layer consists of aluminum-tin oxide, wherein the first sub-layer of the over-coating layer is formed directly on the barrier layer, the second sub-layer of the over-coating layer is formed directly on the first sub-layer of the over-coating layer, and the third sub-layer of the over-coating layer is formed directly on the second sub-layer of the over-coating layer; and forming a dielectric layer directly on the third sub-layer of the over-coating layer, wherein the dielectric layer consists of silicon nitride, wherein the low-e panel has a solar transmittance of over 70%.

7. The method of claim 6, wherein the transparent substrate comprises glass, further comprising forming a second dielectric layer directly on the transparent substrate, wherein the second dielectric layer consists of silicon nitride and the base layer is formed directly on the second dielectric layer, and wherein the low-e panel has a solar transmittance of 71.2%.

8. The method of claim 7, wherein each of the first sub-layer of the over-coating layer and the third sub-layer of the over-coating layer has a thickness of 4 nanometers (nm), and the second sub-layer of the over-coating layer has a thickness of 24 nm.

9. The method of claim 8, wherein each of the first dielectric layer and the second dielectric layer has a thickness of about 25 nm, the base layer has a thickness of about 10 nm, the seed layer has a thickness of about 10 nm, the reflective layer has a thickness of about 10 nm, and the barrier layer has a thickness of between 3 nm and 10 nm.

10. A low-e panel comprising:

a transparent substrate, wherein the transparent substrate comprises glass;

a first dielectric layer formed directly on the transparent substrate, wherein the first dielectric layer consists of silicon nitride;

a base layer formed directly on the first dielectric layer, wherein the base layer consists of aluminum-tin oxide;

a seed layer formed directly on the base layer, wherein the seed layer consists of zinc oxide;

a reflective layer formed above directly on the seed layer, wherein the reflective layer consists of silver;

a barrier layer formed directly on the reflective layer, wherein the barrier layer consists of nickel-titanium-niobium oxide;

an over-coating layer formed above the barrier layer, the over-coating layer comprising first, second, and third sub-layers, wherein the second sub-layer is between the first and third sub-layers, the first and third sub-layers consist of zinc oxide, and the second sub-layer consists of aluminum-tin oxide, wherein the first sub-layer of the over-coating layer is formed directly on the barrier layer, the second sub-layer of the over-coating layer is formed directly on the first sub-layer of the over-coating layer, and the third sub-layer of the over-coating layer is formed directly on the second sub-layer of the over-coating layer; and a second dielectric layer formed directly on the third sub-layer of the over-coating layer, wherein the second dielectric layer consists of silicon nitride, wherein the low-e panel has a solar transmittance of over 70%.

11. The low-e panel of claim 10, wherein each of the first sub-layer of the over-coating layer and the third sub-layer of the over-coating layer has a thickness of 4 nanometers (nm), and the second sub-layer of the over-coating layer has a thickness of 24 nm, and wherein the low-e panel has a solar transmittance of 71.2%.

12. The low-e panel of claim 11, wherein the barrier layer has a thickness of between 3 nm and 10 nm.

13. The low-e panel of claim 12, wherein the reflective layer has a thickness of about 10 nm.

14. The low-e panel of claim 13, wherein the base layer had a thickness of about 15 nm, and the seed layer has a thickness of about 10 nm.

15. The low-e panel of claim 14, wherein each of the first dielectric layer and the second dielectric layer has a thickness of about 25 nm.

16. The method of claim 10, wherein each of the base layer and the second sub-layer of the over-coating layer is formed by co-sputtering material from two targets.

* * * * *